United States Patent [19]

Katz et al.

[11] Patent Number: 4,571,339
[45] Date of Patent: Feb. 18, 1986

[54] PROCESS FOR EFFICIENTLY CONCENTRATING AN AROMA STREAM

[75] Inventors: Saul N. Katz, Monsey; Gerald J. Vogel, Tarrytown, both of N.Y.

[73] Assignee: General Foods Corporation, White Plains, N.Y.

[21] Appl. No.: 699,362

[22] Filed: Feb. 7, 1985

[51] Int. Cl.$^4$ ............................................. A23F 5/48
[52] U.S. Cl. .................................. 426/387; 426/492; 426/594; 203/29; 203/37
[58] Field of Search ...................... 426/387, 492, 594; 203/50, 29, 33, 36, 37

[56] References Cited

U.S. PATENT DOCUMENTS

| | | | |
|---|---|---|---|
| 2,207,111 | 7/1940 | Rodenberg | 203/37 X |
| 2,513,813 | 7/1950 | Melleville | 426/387 |
| 3,223,534 | 12/1965 | Kelly | 426/387 |
| 3,244,530 | 4/1966 | Byer et al. | 426/387 |
| 3,767,828 | 10/1973 | White | 426/387 |
| 4,362,601 | 12/1982 | Morita | 203/50 X |

FOREIGN PATENT DOCUMENTS

| | | | |
|---|---|---|---|
| 246454 | 10/1926 | United Kingdom | 426/386 |
| 1207613 | 10/1970 | United Kingdom | 203/50 |

OTHER PUBLICATIONS

Hodgman et al., Handbook of Chemistry & Physics, 36th Ed., 1954, CRC: Cleveland Ohio, pp. 2245-2246.
Sivetz et al., Coffee Technology, 1979, Avi: Westport, Conn., pp. 474-475.
Sivetz, Coffee Processing Technology, vol. II, 1963, Avi: Westport, Conn., pp. 44-47.

*Primary Examiner*—Joseph Golian
*Attorney, Agent, or Firm*—Basam Nabulsi; Joseph T. Harcarik; Daniel J. Donovan

[57] ABSTRACT

This invention relates to the use of a salt and/or a mild caustic in solution to increase the relative volatility of aromatics contained in an aqueous stream. The increased relative volatility so achieved enables more efficient concentration of the aromas via distillation. The pH of the aroma-containing aqueous stream does not exceed 7.0 through the addition of the salt or caustic to prevent aroma degradation.

8 Claims, No Drawings

PROCESS FOR EFFICIENTLY CONCENTRATING AN AROMA STREAM

TECHNICAL FIELD

This invention relates to a new and improved process for concentrating and recovering aromas. More specifically, this invention relates to a process for improving the efficiency of an aroma concentration system.

BACKGROUND OF THE INVENTION

The preservation of aroma streams is recognized throughout the food art as being extremely important to the quality of food products. For example, in the soluble coffee art, extensive development work has been done to recover aroma streams otherwise lost during processing. However, aroma-containing streams from roast and ground coffee are generally extremely dilute and require significant concentration to permit their effective use.

Concentration of aroma-containing streams is commonly performed in a low temperature vacuum distillation column requiring a number of trays or stages to effect a desired increase in aroma concentration. It is not uncommon using existing art procedures to contemplate a great number of trays to effect the desired concentration of aromas, which then allows addback of the aroma-containing stream to a concentrated extract without significant dilution of the extract stream.

A need therefore exists for a process which improves the economics of distillation while at the same time providing for efficient separation of aroma constituents as may be desired in a specific application.

DISCLOSURE OF THE INVENTION

The present invention is founded upon the discovery that an improved, more efficient concentration of coffee aromas contained in an aqueous stream is enabled by the addition of a salt and/or a mild caustic to an aqueous stream containing coffee aromas prior to distillation. It has been found that said salt or caustic addition increases the relative volatility of the aromatics in an aroma stream, relative volatility being defined as the ratio of the concentration of the components in the vapor phase divided by the ratio of the same components in the liquid phase. If water is defined as 1 in terms of relative volatility, it has been found that the relative volatilities of substantially all the coffee aromatics which contribute to coffee flavor range from 2 to in excess of 50. Many of the most desirable coffee aroma components have relative volatilities in the region of 3 to 5 which renders concentration of these aromas relatively difficult. As a rule, it becomes easier to remove an aromatic component from water via distillation the higher its relative volatility. Thus, the advantage of the invention, i.e., increased relative volatility of aromatic components, is readily apparent.

The invention may be practiced on any aqueous coffee aroma stream. Addition of a salt or mild caustic solution to a stream may act to increase the pH of said stream. Generally, however, the pH of the aroma-containing stream should be kept below 7, preferably at a pH of from 2.5 to 7, because aroma degradation results above pH 7. The level of salt and/or caustic used will vary depending upon the economics of the process involved. Generally, the level will exceed 0.5% by weight of the aqueous stream and may range upwardly to as high as the solubility level of the salt/caustic, provided the pH of the aroma-containing stream is maintained below 7. In a preferred embodiment, the salt and/or caustic is placed in aqueous solution prior to its addition to the aroma containing stream, most preferably at as high a concentration as is permitted by the salt and/or caustic solubility in water, to facilitate mixing of the salt and/or caustic with the aroma-containing stream. According to the present invention, the relative volatilities of flavorful coffee aromatics in the aroma-containing stream are generally increased by more than 5%, typically by more than 10%, preferably by more than 15%, and most preferably by greater than 20%.

The increased efficiency in coffee aroma concentration achieved by the present invention is believed to derive from the strongly electrolytic character exhibited by salts and caustics when dissolved in a highly polar, aqueous solution. The hydrated ions which are formed in the aqueous solution are believed to surprisingly interact only with certain compounds contained therein. Said interaction is with compounds which do exhibit some degree of volatility but do not contribute appreciably to coffee flavor and/or aroma. Thus, the molecular interaction by the hydrated salt or caustic ions acts to increase the relative volatilities of valuable coffee flavors and aroma compounds with whom no interaction takes place by negating the volatility of other, non-flavorful compounds. Though the above theory is believed to describe the invention, the invention is not intended to be limited thereto.

After the salt and/or mild caustic is added to the aqueous aroma-containing stream to form what is termed an "addition product", the addition product is fed to a distillation column. Some degree of agitation may be employed to ensure a homogeneous addition product solution. However, pumping of the addition product to the distillation column generally provides sufficient mixing of the addition product. Distillation is then performed according to recognized distillation methods in the art. The distillate recovered at the top of the distillation column may then be added to a substrate, generally a coffee substrate, and typically a coffee extract. In the case where the distillate is added to a coffee extract, it is preferred that the extract be concentrated prior to said addition, typically by evaporation. The coffee extract with distillate added may then be dried, as by spray drying or freeze drying, to produce a flavorful soluble coffee.

An example of the manner and degree to which the present invention may be used to increase the relative volatility of coffee aromas and thereby improve the efficiency of aroma concentration via distillation is hereafter provided. The invention is not seen to be limited to improved concentration of coffee aromas, but rather may be applied wheresoever an increased relative volatility would improve separation.

EXAMPLE

Table I indicates the relative volatility of furfural as it is effected by the addition of NaCl to a coffee aroma stream. Relative volatility or "alpha" is a measure of the volatility of a compound as compared to the volatility of water, in this case the volatility of furfural as compared to that of water. The actual relative volatility was derived by gas chromatograph analysis. Furfural is often employed within the art as a "tracer" compound, its behavior being used to predict the behavior of other coffee aromatics.

TABLE I

| % Salt (NaCl) Added By Weight | Alpha (Relative Volatility) | % Increase in Alpha |
|---|---|---|
| No salt added | 6.05 | — |
| 1 | 7.20 | 20% |
| 5 | 7.80 | 30% |

The benefit provided by an increase in the relative volatility of furfural, as a compound representative of other flavorful coffee aromatics, is demonstrable by showing the reduction in column diameter and corresponding energy savings that can be realized in distillation. Using a structured packaging fabricated from 304 stainless steel with ½ inch crimp height and a 45° crimp angle relative to the horizontal plane, the surface area being 75 sq. ft. per cu. ft. with a packing factor of 22 and a void space of 93%, the following column sizing information may be calculated according to recognized chemical engineering principles.

TABLE II

| % Salt (NaCl) Added | Relative Volatility | Theoretical Trays | Reflux Ratio | Column Diameter | Energy Reduction |
|---|---|---|---|---|---|
| No Salt added | 6.05 | 5 | 2.76 | 18" | (base) |
| 1% | 7.2 | 5 | 2.06 | 16" | 19% |
| 5% | 7.8 | 5 | 1.79 | 15" | 26% |

It will be noted by reference to Table II that there is a significant decrease in the column diameter and a corresponding decrease in the energy required for distillation as the percent salt added to the coffee aroma stream to be distilled is increased.

It may be granted that one skilled in the art might appreciate that as column diameter is lowered, the energy consumed to achieve a desired separation and enrichment of the aroma material will be decreased. But, the effect of the addition of salt to the aroma stream is surprising in its increase of the volatility of the flavorful aroma components relative to that of water, thereby allowing said column diameter reduction and energy savings without sacrificing the degree to which the aroma-containing stream is concentrated.

We claim:

1. A process for enhancing the aroma constituency of soluble coffee which comprises adding to an aqueous coffee aroma stream at least 0.5% by weight salt, mild caustic or a mixture thereof, in an amount effective to increase the relative volatility of the coffee aromas contained therein by at least 5%, to form an addition product, distilling the addition product to recover a more concentrated coffee aroma, and adding the recovered coffee aroma to a coffee substrate.

2. The process of claim 1 wherein the addition product is at a pH of 2.5 to 7.0.

3. The process of claim 1 wherein the salt is chosen from a group consisting of sodium chloride and potassium chloride.

4. The process of claim 1 wherein the mild caustic is chosen from a group consisting of sodium carbonate, sodium bicarbonate, potassium carbonate, potassium bicarbonate and calcium hydroxide.

5. The process of claim 1 wherein the salt, mild caustic or mixture thereof, is placed in aqueous solution prior to its addition to the aqueous coffee aroma stream.

6. The process of claim 1 wherein the salt, mild caustic or mixture thereof, is added in an amount effective to increase the relative volatility of the coffee aromas by at least 10%.

7. The process of claim 1 wherein the salt, mild caustic or mixture thereof, is added in an amount effective to increase the relative volatility of the coffee aromas by at least 15%.

8. The process of claim 1 wherein the salt, mild caustic or mixture thereof, is added in an amount effective to increase the relative volatility of the coffee aromas by at least 20%.

* * * * *